(No Model.) 3 Sheets—Sheet 1.

W. STERNBERG.
CIGAR BUNCHING MACHINE.

No. 305,247. Patented Sept. 16, 1884.

Attest
J. Paul Mayer
E. Scully

Inventor
William Sternberg
By Thos. S. Sprague
Atty (No Model.) 3 Sheets—Sheet 2.
W. STERNBERG.
CIGAR BUNCHING MACHINE.
No. 305,247. Patented Sept. 16, 1884.
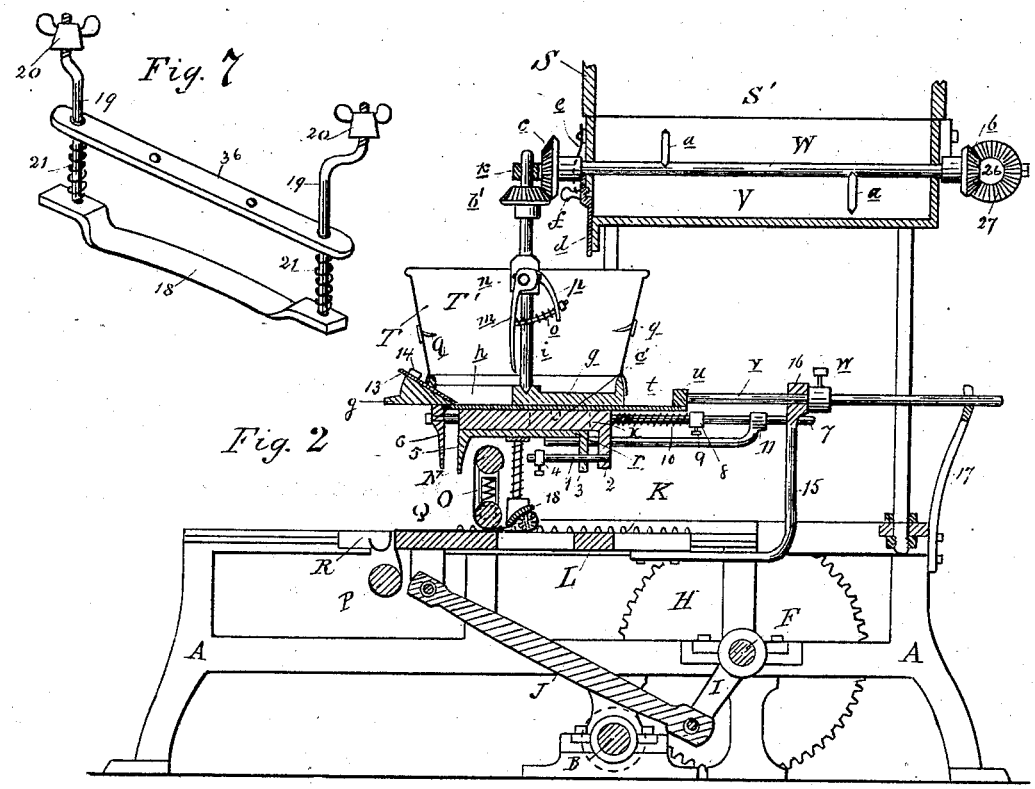
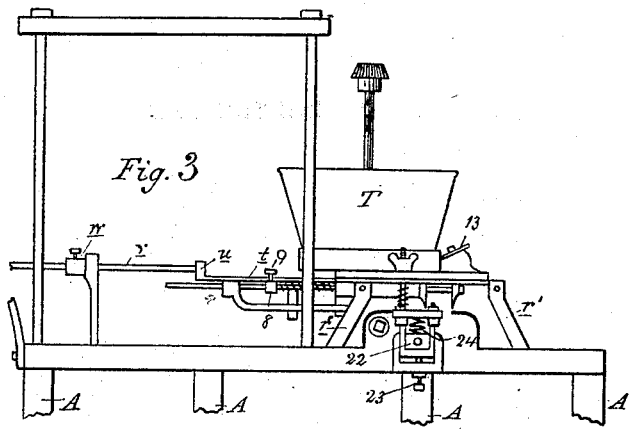
Attest
J. Paul Mayer
E. Scully
Inventor
William Sternberg
By Thos. S. Sprague
Atty (No Model.) 3 Sheets—Sheet 3.
W. STERNBERG.
CIGAR BUNCHING MACHINE.
No. 305,247. Patented Sept. 16, 1884.
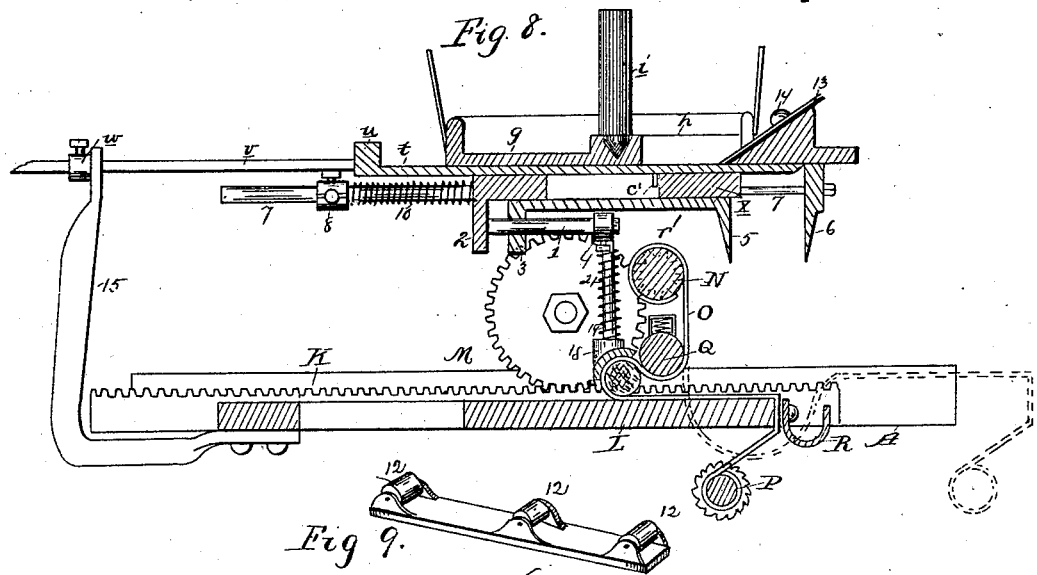
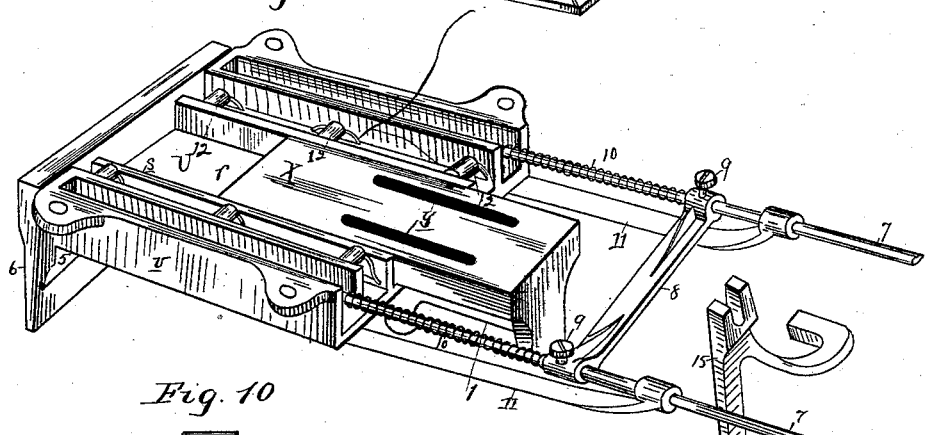
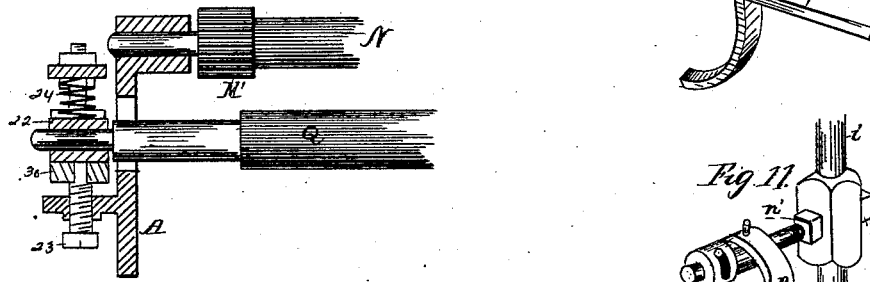
WITNESSES:
William Turner
E. H. Bond
INVENTOR
Wm Sternberg
BY T. W. Robertson
ATTORNEY

UNITED STATES PATENT OFFICE.

WILLIAM STERNBERG, OF DAVENPORT, IOWA.

CIGAR-BUNCHING MACHINE.

SPECIFICATION forming part of Letters Patent No. 305,247, dated September 16, 1884.

Application filed December 12, 1883. (No model.)

*To all whom it may concern:*

Be it known that I, WILLIAM STERNBERG, of Davenport, in the county of Scott and State of Iowa, have invented new and useful Improvements in Cigar-Bunching Machines; and I do hereby declare that the following is a full, clear, and exact description thereof, reference being had to the accompanying drawings, which form a part of this specification.

This invention relates to an improvement in bunching-machines such as are used in the manufacture of cigars; and the invention is intended to form an improvement upon a bunching-machine patented to Alexander Gordon, May 2, 1882, No. 237,316, and with which my machine is identical as far as the construction and operation of the bunching devices proper are concerned.

The improvement hereinafter described relates, mainly, to improved feeding devices to such machine, and also in various other constructive arrangements, by means of which a better result of the operation of the machine is sought to be obtained.

One great difficulty in bunching-machines is to construct a mechanical filler-feeding device that will not produce more or less separation between the coarser and finer parts of the filler material. Another difficulty is to separate from the main supply the required amount of filler for each individual bunch in a constantly unvarying quantity.

It is the object of my improved feeding mechanism to overcome these difficulties in the manner and by the devices hereinafter described.

Figure 5:
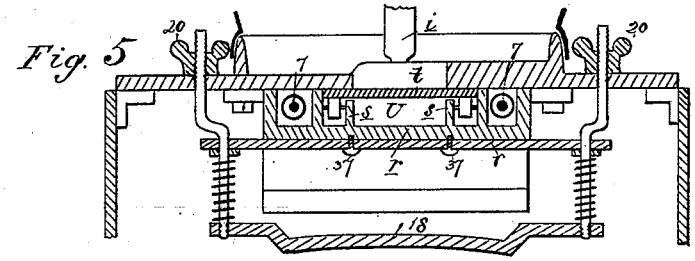
Figure 1:
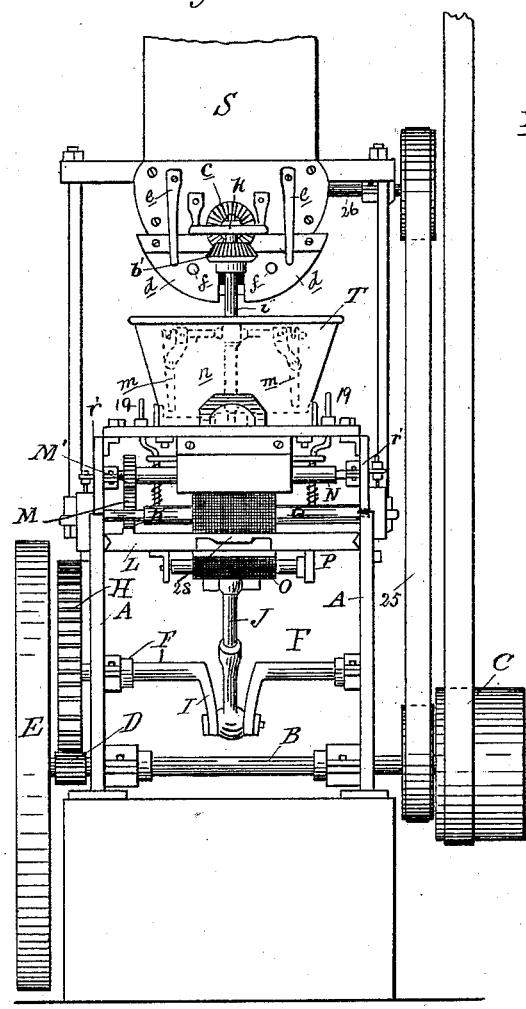
Figure 4:
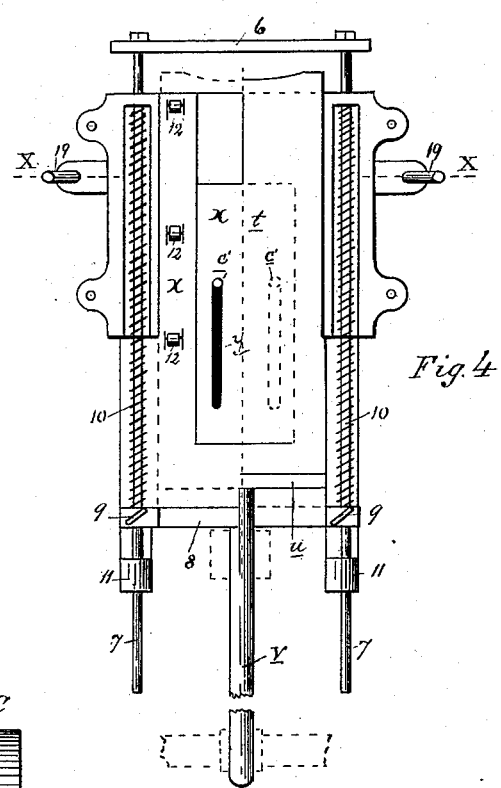
Figure 6:
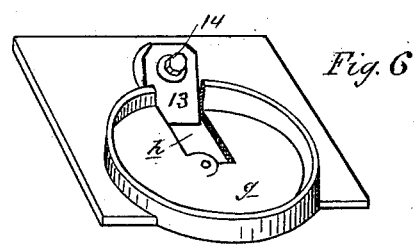

In the drawings which accompany this specification, Figure 1 is a front elevation of my machine. Fig. 2 is a vertical central longitudinal section. Fig. 3 is a part of a side elevation of the machine. Fig. 4 is a detached top plan view of the individual filler-receptacle, with its devices for separating the required amount of filler for each individual bunch. Fig. 5 is a cross-section on line X X in Fig. 4. Fig. 6 is a detached perspective view of the bottom of the intermediate hopper. Fig. 7 is a detached perspective view of the shaping-bar. Fig. 8 is a similar section to Fig. 2, illustrating the operation of bunching. Fig. 9 is a perspective view of the individual filler-receptacle detached. Figs. 10, 11, and 12 are details specifically referred to hereinafter.

A represents the frame of the machine, which supports all the operating parts thereof. B is the main shaft, to which, at one end, the drive-pulley C is secured, and a pinion, D, and fly-wheel E are secured to the opposite end. F is a counter-shaft, to which is secured the gear-wheel H, which meshes with the pinion D. I is a crank actuating the pitman J. L is the bunching-table, adapted to reciprocate between guides at the top of the frame A. K is a rack on top of the table engaging into the gear-wheel M, which in turn meshes with a pinion, M', upon the cloth-roll N. O is the bunching-cloth, secured at one end to the cloth-roll N, and at the opposite end to the roll P, secured to the table, near the front end thereof. Q is the bunching-roll journaled in the frame below the cloth-roll N. R is the bunch-receptacle, which is secured to the forward end of the table L. These parts constitute the bunching-machine proper, and, with the exception of some parts hereinafter specially mentioned, they are constructed and operate the same as in the patent aforementioned.

Supported upon and above the main frame A in any convenient manner is the feeding device, by means of which the required amount of filler for each individual bunch is mechanically separated from the supply and automatically delivered upon the bunching-cloth with each reciprocation of the table L.

The feeding device consists of three distinct parts: first, the main receptacle S, from which the filler material for the manufacture of the bunches is supplied; second, an intermediate receptacle, T, into which a certain amount of filler from the main receptacle is mechanically discharged; third, the individual filler-receptacle U, Fig. 9, which holds the required amount of filler material for an individual bunch, and which is provided with cut-off and ejecting devices, hereinafter described, by means of which an individual amount of filler is separated from the supply in the intermediate receptacle and dropped onto the bunching-cloth.

The main or principal receptacle S for the filler material is supported above the other receptacles, and is constructed and arranged as follows: S' is the hopper proper. V is a trough forming the bottom of the hopper. W is a shaft journaled in the ends of the trough. *a a* are stirring-arms secured to the shaft. *b* is a bevel-pinion upon the rear end of the shaft, and *c* is a bevel-pinion secured to the front end of said shaft. *d d* form the two halves of a sliding door at the front end of the trough. *e e* are springs exerting their tension against the sliding doors, so as to hold the same against accidental displacement. *f f* are knobs or handles upon the doors *d d*, by means of which they can be closed together or drawn apart at the will of the operator, so as to form a larger or smaller opening at the front end of the trough, through which a graduated amount of filler can pass out and drop into the intermediate receptacle, which is situated just below it. This intermediate receptacle, T, consists of the hopper T', which is detachably secured to its base or bottom *g*. This bottom (shown in Fig. 6 detached) is provided with an opening, *h*, and is formed in the shape of a spiral, beginning at one side of the opening *h* and terminating at the opposite side thereof. *i* is a vertical shaft stepped at the center of the bottom *g* of the receptacle, and held at the top in the bearing *k*. *b'* is a bevel gear-wheel secured to the shaft *i* and meshing with the bevel-gear *c*. *m m* are two stirrers, which are sleeved upon the cross-bar *n*. The cross-bar *n* (see Fig. 11) is threaded through the shaft *i*, and provided with adjusting screw-nuts *n' n'* on either side thereof, allowing of one arm of the cross-bar to be shortened while the other is lengthened. The stirrers are sleeved upon the end of the cross-bar *n*, so as to be yielding, a coil-spring, *o*, being interposed between said stirrers and the stationary arm *p*. *q* are clearers projecting upon the inside of the hopper T'. The intermediate receptacle, T, is supported upon the frame A of the machine by the legs *r'*.

The individual filler-receptacle U, Figs. 5 and 9, is constructed as follows: *r* is a plate secured to the under side of the bottom plate of the intermediate receptacle. This plate is provided with two parallel flanges, *s s*, which form the sides of the individual receptacle, while the plate *r* forms the bottom thereof; and *t*, Fig. 8, is a reciprocating knife situated directly below the aperture *h*, and on top of the individual filler-receptacle U. A cross-head, *u*, is secured to the rear ends of the knife, and to this is secured a rod, *v*. *w* is a collar adjustably secured upon the rod *v*. *x* is a plunger of proper size to reciprocate in the individual receptacle. *y* are two parallel slots in the plunger, into which the pins *c'*, which are secured to the under side of the knife *t*, engage.

1 is a guide-bar secured to a downhanging lug, 2, of the plunger. It is guided through a hole in the flange 3, which projects downwardly from the plate *r*. 4 is a collar adjustably secured by a set-screw upon the guide-bar 1. 5 is a vertical flange or guide-plate projecting downwardly from the forward end of the plate *r*. 6 is a gate adapted to close and disclose the forward end of the individual filler-receptacle; it is secured to two parallel rods, 7 7. 8 is a cross-bar connecting these two parallel rods near their rear ends, and it is adjustably secured to these two rods by means of set-screws 9 9. 10 10 are coil-springs placed around the rods 7, so as to exert their tension to close the gate 6 against the forward end of the individual filler-receptacle. 11 11 are two arms secured to the under side of the plate *r* and designed to form guides for the parallel rods 7. 12 are a number of friction-rollers secured in any convenient manner to the plate *r*, and so placed that they support and relieve the friction of the reciprocating knife *t*. 13 is an inclined stationary knife adjustably secured by a set-screw, 14, near the forward end of the bottom plate of the intermediate receptacle, and so placed that it forms at the forward end of the aperture *h* a cutting-edge, against which the cutting-edge of the reciprocating knife *t* operates as it slides under it. 15 is an arm or tappet secured to the bunching-table L. Its upper end, 16, is forked and engages upon the rod *v* between the cross-head *u* of the knife and the adjustable collar *w*. 17 is a support secured to the rear end of the frame in any convenient manner, and forming a guide for the rod *v*. It is also open on top, like the tappet 15, so as to allow the rod *v* to be lifted out when the machine is dismounted. 18 is a shaping roll or bar placed in the rear of the bunching-roll Q. (This bar is shown detached in Fig. 7.) It is held in position by the rods 19, which suspend said bar 18 from the bottom plate of the intermediate receptacle. 20 20 are thumb-screws, by means of which the shaping-bar 18 can be adjusted to any desired height above the bunching-table. 21 21 are coil-springs placed around the lower ends of the rods 19, exerting their tension when the shaping-bar 18 is vertically displaced.

The bunching-roll Q is journaled in boxes 22, (see Figs 10 and 3,) which rest in saddles 30 in the frame A. They can be vertically adjusted by means of set-screws 23, and a spring, 24, is placed on top of each box to give a yielding resistance to an upward displacement of the punching-roll. Motion is communicated to the feeding device by means of a belt, 25, which transmits motion from the main shaft B to a counter-shaft, 26, secured to the rear of the main receptacle, and by a bevel-gear, 27, upon said counter-shaft transmits motion to the shaft W by means of the bevel-gear *b*. Secured to the forward end of the bunching-table is a bunch-receiver, which is of known shape, except that a portion of the front wall thereof is cut away between the ends, as marked at 28 in the detached perspective thereof shown in Fig. 12.

In practice, if motion is communicated to the machine by a belt upon the driver C, the motion will be transmitted from the main shaft B to the counter-shaft F, which, by actuating the crank I and pitman J, will give a reciprocating motion to the bunching-table L, and by reason of the engagement of the gear-wheel M with the rack K on top of the bunching-table, and the pinion M' upon the end of the cloth-roll N, Fig. 8, this latter one will wind and unwind the bunching-cloth O, as the rolls N and Q do not travel with the table. The motion from the main shaft B is also communicated by the belt 25 to the counter-shaft 26, bevel-gear 27, bevel-gear $b$, shaft W, bevel-gear $c$, bevel-gear $b'$, shaft $i$, and stirrers $m$. Now, if the hopper S' is supplied with filler material and the doors $d$ in the front of the trough V opened, a certain amount of filler material will be discharged in a constant flow into the intermediate receptacle beneath. The action of the arms $a$ upon the shaft W is more for the purpose of keeping the finer and coarser materials of the filler well mixed and the trough constantly filled than to produce a forcible ejection of the filler material through the opening disclosed by the doors. By the action of the stirrers $m$ the filler material in the intermediate receptacle will be scraped into the opening $h$ and dropped into the individual filler-receptacle U, underneath said opening. The motion of the reciprocating bunching-table L will produce, by means of the tappet 15, which engages upon the rod $v$, an intermittingly-reciprocating motion of the knife $t$, pushing the knife forward as soon as the tappet strikes the cross-head $u$, and drawing it back again when it strikes the collar $w$ upon its return motion. At the same time the tappet 15, striking during its forward motion against the cross-bar 8, will also push the gate 6 open. The motion of the plunger $x$ is effected by the engagement of the pins $c'$ $c'$ on the under side of the knife into the slots $y$ of the plunger. When by the action of the tappet 15 the knife $t$ is withdrawn, the plunger $x$ will also be withdrawn by means of the pins $c'$ engaging the same, and the filler material in the hopper T' will be scraped into the individual filler-receptacle. During the return movement of the tappet the knife $t$ will be pushed ahead and cut off the contents of the individual filler-receptacle from the filler material in the intermediate receptacle. As soon as this has been done the plunger $x$ will be carried forward, and the gate 6 will also be pushed open, allowing the filler material ejected from the individual receptacle by the plunger $x$ to drop onto the bunching-cloth, which is now in the position shown in dotted lines in Fig. 8. At the return movement of the tappet 15 the knife, plunger, and gate will be returned into their starting positions, the coil-springs 10 around the rods 7 closing the gate 6 by their tension in the same degree as the knife recedes, as the forward end of the knife prevents the gate from closing. As soon as the filler is discharged upon the bunching-cloth—which is done in the usual manner—the bunching-table L begins its return motion, and the operator having put a wrapper in proper position upon the bunching-cloth, the bunch will be rolled during the return movement of the table L. The cloth-roll N, while rolling up the bunching-cloth, rolls the bunch against the shaping-bar 18 until the bunch-receptacle R draws into position underneath the bunch and receives it.

The discharge-opening for the filler from the main receptacle into the intermediate receptacle is so situated that the operator, who stands at the front of the machine, can readily see it, and by adjusting the sliding doors $d$ he can at all times maintain a uniform quantity of filler in the intermediate receptacle, preventing thereby the influence which in other machines produces uneven bunches, owing to the varying compactness of the material from which the filler for each bunch is separated. The arrangement of the shaft W, with its stirrers $a$, at the bottom of the main receptacle S' prevents an accumulation of the finer materials and dust in the filler. The stirrers $m$ are made yielding, so as to prevent the filler from getting pressed or packed into the aperture $h$, and they revolve in the proper direction to be aided in their operation of scraping the filler into the opening $h$ by the spiral-shaped bottom of the intermediate receptacle. The clearers $q$ in the side of the intermediate receptacle prevent the filler from being carried around in too large a quantity. The stirrers (to scrape more evenly) travel in a different path from each other, and they can be adjusted by means of the screw-nuts $n'$.

The inclined position of the stationary knife 13 relieves any unnecessary friction, which is occasioned by dust in other machines where the two knives are arranged in the same plane. The size of the individual filler-receptacle U is easily adjusted by means of the adjustable collar $w$, for if this collar is adjusted to the knife such knife and the plunger $x$ will be carried farther back, lengthening thereby the individual receptacle. The support 17 tends to hold the knife $t$ in position, and the friction-rolls 12 relieve any unnecessary friction between the knife and plunger. The guide-rod 1 guides the movement of the plunger, and by means of the adjustable collar 4 it may be prevented from being carried back any farther than desired by the momentum which it may have acquired during its travel when the machine is running fast. The gate 6 is made to run true by the braces 11, which support the guide-rods 7 in their rear ends, and its proper time of opening is regulated by the adjustable cross-bar 8. The individual filler-receptacle can be easily detached from the bottom side of the intermediate receptacle for the purpose of putting a larger or smaller one in its place, if desired. The bunch-holder, into which the bunch is received after it is rolled, is cut out in the middle, so that the bunch can be taken out easily (while it is kept in shape) by being seized by the operator at top and bottom. The bunching-roll Q and shaping-bar 18 exert a yielding pressure while a bunch is being rolled.

The discharge-opening from the main receptacle is placed in sight, and convenient for the operator to adjust, and the contents of the intermediate receptacle are constantly under his eye, so that it is easy for him at all times, without neglecting his work, to attend to any necessary regulation of the feed.

What I claim as my invention is—

1. In a cigar-bunching machine, the combination of an individual receptacle, U, with a main supply-receptacle, S, provided with mechanism for automatically discharging the contents of the same, and means for regulating the amount of said discharge, and an intermediate receptacle adapted to receive said discharge, and from which the individual amount of filler material is obtained and positively and automatically discharged into the receptacle U, for the purpose of maintaining a like degree of compactness of all the material for the bunches, as set forth.

2. In a cigar-bunching machine, the receptacle S, provided with discharge-opening, in combination with the sliding doors $d$ for regulating the size of said opening, and the springs $e$ for adjustably holding said doors in position, substantially as shown, and for the purpose specified.

3. The intermediate filler-receptacle provided with a bottom forming one thread of a spiral, a discharge-opening placed in said bottom between the highest and lowest part of the spiral, and a stirring device revolving in the axis of the spiral, substantially as and for the purposes described.

4. In combination with the intermediate filler-receptacle, T, and its discharge-opening, a stirring device revolving horizontally in the axis of said receptacle, and consisting of a vertical shaft, yielding stirring-arms, and a cross-bar, to which the latter are attached, and which is adjustably secured in the direction of its axis to the shaft, so as to alter the path of the stirring-arms at will, substantially as and for the purpose described.

5. An intermediate filler-receptacle consisting of the hopper T′, spirally-formed bottom $g$, having discharge-opening $h$, vertical shaft $i$, stirring-arms $m$, screw-nuts $n'$, and clearing-fingers $q$, all combined and operating substantially as and for the purposes described.

6. In combination with the individual filler-receptacle and its intermittingly-reciprocating cut-off or knife $t$ and rod $v$, the support 17, and friction-rollers 12, whereby the knife is made to run true and prevented from being wedged by the dust, substantially as described.

7. The combination, with the receptacle T, having a discharge-opening, of the intermittingly-reciprocating knife $t$ and the stationary knife 13, arranged in a plane inclined to the plane of the knife $t$, substantially as and for the purposes described.

8. In combination with the individual filler-receptacle U, provided with the flange 3, the reciprocating plunger $x$, which expels the filler material from said receptacle, provided with the guide-rod 1 and adjustable collar 4, whereby the plunger may be prevented from being accidentally retracted any farther than the movement of the knife $t$ will carry it, substantially as and for the purpose described.

9. In a cigar-bunching machine, and in combination with the cloth-roll N thereof, which winds and unwinds the bunching-cloth, between a fold of which the bunch is rolled, the loose roll Q, around which the bunching-cloth is guided, and vertically-adjustable boxes provided with a tension device on top thereof, in which the roll is journaled, so that the roll Q may lift vertically when the tension upon the bunching-cloth should become too great, substantially as described.

10. In a cigar-bunching machine, the combination, with the self-adjusting roll Q and the bunching-cloth O, passing around the same, and in the bight of which the bunch is rolled, of the shaping-bar 18, against which the bunch, while being held in the bight of the bunching-cloth, is rolled, and which forms a mold by which the bunch is shaped, substantially as described.

11. In a cigar-bunching machine, and in combination with the self-adjusting roll Q and the bunching-cloth O, passing over the same, in the bight of which the bunch is rolled, the shaping-bar 18, which forms a mold in which the bunch is shaped while being rolled against it, and the adjustable roll, a device for adjusting said bar at varying height, and a tension device allowing said bar to lift vertically against the tension of such device, whereby it may be adjusted, in conjunction with the roll Q, to exert the necessary amount of pressure for shaping the bunch without interfering at any time with the proper function of the bunching-cloth.

WILLIAM STERNBERG.

Witnesses:
NICHOLAS KUHNEN,
OTTO ALBREDCT.